USOO9736240B2

(12) United States Patent
Dietz et al.

(10) Patent No.: US 9,736,240 B2
(45) Date of Patent: Aug. 15, 2017

(54) IN-BAND MANAGEMENT OF A NETWORK ATTACHED STORAGE ENVIRONMENT (71) Applicant: International Business Machines Corporation, Armonk, NY (US)

(72) Inventors: Mathias Dietz, Oberhausen (DE); Markus Rohwedder, Dexheim (DE); Rainer Wolafka, Hofheim am Taunus (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 14/062,080

(22) Filed: Oct. 24, 2013

(65) Prior Publication Data

US 2014/0149530 A1 May 29, 2014

(30) Foreign Application Priority Data

Nov. 26, 2012 (GB) .................................. 1221204.9

(51) Int. Cl.
*G06F 15/167* (2006.01)
*H04L 29/08* (2006.01)
*H04L 29/06* (2006.01)

(52) U.S. Cl.
CPC .......... *H04L 67/1097* (2013.01); *H04L 63/10* (2013.01)

(58) Field of Classification Search
CPC .............................. H04L 67/1097; G06F 12/00
USPC ......................................................... 709/213
See application file for complete search history.

(56) References Cited

U.S. PATENT DOCUMENTS

| 7,401,139 | B1 | 7/2008 | Allen et al. |
| 7,546,354 | B1 * | 6/2009 | Fan et al. ..................... 709/219 |
| 7,577,729 | B1 * | 8/2009 | Umbehocker et al. ....... 709/223 |
| 8,326,882 | B1 * | 12/2012 | Desai et al. .................. 707/792 |
| 9,110,920 | B1 * | 8/2015 | Amegadzie ....... G06F 17/30238 |
| 2003/0135674 | A1 | 7/2003 | Mason, Jr. et al. |
| 2003/0154281 | A1 * | 8/2003 | Mitsuoka et al. ............ 709/225 |
| 2003/0154314 | A1 * | 8/2003 | Mason, Jr. ........ H04L 29/12009 709/250 |

(Continued)

OTHER PUBLICATIONS

Procfs (or the Proc file system) retrieved from the internet on Oct. 21, 2013, http://en.wikipedia.org/wiki/Proc_file_system, 5 pages.

(Continued)

*Primary Examiner* — Nicholas Taylor
*Assistant Examiner* — Meng Vang
(74) *Attorney, Agent, or Firm* — Cantor Colburn LLP (57) ABSTRACT An aspect includes a method for in-band management of a network attached storage environment. A client is connected via a standard network attached storage protocol to a network attached storage system using existing authorization and authentication procedures. Advanced management functions are exposed to the client via a special file system structure over the standard network attached storage protocol. The client uses existing standard network attached storage protocol functions on the special file system structure to retrieve and to invoke the advanced management functions. Result data are returned to the client using a feedback channel and the standard network attached storage protocol.

11 Claims, 3 Drawing Sheets (56) References Cited

U.S. PATENT DOCUMENTS

| | | | |
|---|---|---|---|
| 2006/0074927 A1* | 4/2006 | Sullivan | G06F 17/30067 |
| 2006/0095705 A1* | 5/2006 | Wichelman et al. | 711/171 |
| 2007/0186037 A1 | 8/2007 | Winzenried et al. | |
| 2007/0198460 A1 | 8/2007 | Yang et al. | |
| 2008/0091878 A1 | 4/2008 | Stern et al. | |
| 2009/0037934 A1 | 2/2009 | Sullivan | |
| 2011/0235481 A1* | 9/2011 | Matsushita et al. | 369/30.04 |
| 2014/0082508 A1* | 3/2014 | Rajashekar et al. | 715/739 |

OTHER PUBLICATIONS

GB Application No. GB1221204.9, Search Report dated May 17, 2013, 1 page.
IBM Scale Out Network Attached Storage, retrieved from the internet on Oct. 21, 2013, http://www.03.ibm.com/systems/storage/network/sonas/index.html, 2 pages.

* cited by examiner

IN-BAND MANAGEMENT OF A NETWORK ATTACHED STORAGE ENVIRONMENT

PRIORITY

The present application claims priority to Great Britain Application No. 1221204.9 filed on Nov. 26, 2012, and all the benefits accruing therefrom under 35 U.S.C. §119, the contents of which are incorporated by reference in its entirety herein.

FIELD OF THE INVENTION

The present invention relates in general to the field of network attached storage environments, and in particular to a method and a system for in-band management of a network attached storage environment. Still more particularly, the present invention relates to a data processing program and a computer program product for in-band management of a network attached storage environment.

BACKGROUND

Block storage systems in storage area networks (SANs) make their storage available as logical units (LUNs) so that they can be used by hosts, for example to create a file system on these blocks as needed or raw volume usage for databases. Network attached storage (NAS) system on the other side typically expose a logical structure to clients in the form of files and directories referred to as 'shares' or 'exports'. These exports are accessed directly by the consuming clients through standardized file access protocols such as CIFS (Common Internet File System), NFS (Network File System) and others.

Files exposed via network attached storage (NAS) have metadata associated which typically includes information such as their access control lists (ACL), owner information, timestamps (creation, modification) and much more.

A limited common set of basic functions typically is exposed via the network attached storage (NAS) protocols. This includes basic operations such as creation or deletion of files or directories. In addition to these basic functions a network attached storage (NAS) system provides many advanced functions such as various forms of data replication, remote caching, control of lower level files system entities such as file system constructs, space efficient copies of directories and files, control of data placement policies for information life cycle management (ILM) and more. These advanced functions are in most cases vendor specific. Management of more advanced features is primarily done via dedicated management interfaces and network connections such as graphical user interface (GUI) or command-line interface (CLI). This is referred to as 'out-of-band' management.

'In-band' management on the other side is done over existing file access interfaces and networks. Such in-band management capabilities of prior art network attached storage (NAS) systems are limited to the network attached storage (NAS) protocol capabilities and as such cannot easily be extended or customized to include vendor specific advanced functions. In addition it is common practice to access the same network attached storage (NAS) exports via multiple protocols without having a common set of management capabilities across these protocols (such as CIFS, NFS, FTP, HTTP, etc.).

Typical network attached storage (NAS) system includes base system components including a server and storage hardware and controllers. Sitting on top of these basic components are one or more file systems which include the files and directories that are exposed via the network attached storage (NAS) protocols. These exports are accessed over the network by network attached storage (NAS) clients. Management of these network attached storage (NAS) system with prior art is only possible to the full extend via the administrative network attached storage (NAS) clients connected via dedicated management interfaces and networks that communicate to a network attached storage (NAS) internal management component.

In the Patent Application Publication US 2009/0037934 A1 a method and system for configuration and management of client access to network attached storage are disclosed. Disclosed embodiments of the publication provide for automated client-computer connection to network attached storage (NAS) objects within a networked computer system. Disclosed embodiments of the publication, propose a dedicated management channel/interface that consists of a master and client agent along with some network attached storage (NAS) object monitoring component. Using these components a method is described that exchanges "executable code blocks" and notifications between the client and the server storage system. The method describes how an administrator can manage network attached storage (NAS) clients in a network attached storage (NAS) environment via a master agent.

SUMMARY

One embodiment is a method for in-band management of a network attached storage environment. A client is connected via a standard network attached storage protocol to a network attached storage system using existing authorization and authentication procedures. Advanced management functions are exposed to the client via a special file system structure over the standard network attached storage protocol. The client uses existing standard network attached storage protocol functions on the special file system structure to retrieve and to invoke the advanced management functions. Result data are returned to the client using a feedback channel and the standard network attached storage protocol.

Another embodiment is a system for in-band management of a network attached storage environment that includes at least one client connected to a network attached storage system by using existing authorization and authentication procedures. The network attached storage system includes a standard network attached storage protocol, a base system, at least one file system, an internal management component, and an in-band management module configured to communicate with the standard network attached storage protocol, the at least one file system, and the internal management component. The in-band management module is further configured to create a special file system structure to expose advanced management functions to the client using the standard network attached storage protocol. The client uses existing standard network attached storage protocol functions on special files of the special file system structure to retrieve the advanced management functions and to invoke one of the advanced management functions. The in-band management module is further configured to return result data to the client using a feedback channel and the standard network attached storage protocol.

A further embodiment is a computer program product stored on a computer-readable medium, having computer-readable program code, when executed on a computer including a processor, causes the processor to connect a network attached storage system to a client via a standard network attached storage protocol using existing authorization and authentication procedures. Advanced management functions are exposed to the client via a special file system structure over the standard network attached storage protocol. The client uses existing standard network attached storage protocol functions on the special file system structure to retrieve and to invoke the advanced management functions. Result data are returned to the client using a feedback channel and the standard network attached storage protocol.

The above, as well as additional purposes, features, and advantages of the present invention will become apparent in the following detailed written description.

BRIEF DESCRIPTION OF THE SEVERAL VIEWS OF THE DRAWINGS

Exemplary embodiments, as described in detail below, are shown in the drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments provide a method and a system for in-band management of a network attached storage environment, which provide a protocol independent in-band management of a network attached storage (NAS) and allow a user to invoke advanced functionality of the network attached storage (NAS) system and to solve the above mentioned shortcomings and pain points of prior art network attached storage (NAS) systems.

According to an exemplary embodiment, a method for in-band management of a network attached storage environment, a system for in-band management of a network attached storage environment, a data processing program for in-band management of a network attached storage environment, and a computer program product for in-band management of a network attached storage environment are provided.

Accordingly, in an embodiment a method for in-band management of a network attached storage environment comprises the steps of: connecting a client via a standard network attached storage protocol to a network attached storage system using existing authorization and authentication procedures; exposing advanced management functions to the client via a special file system structure over the standard network attached storage protocol; wherein the client uses existing standard network attached storage protocol functions on the special file system structure to retrieve and to invoke the advanced management functions; and wherein a feedback channel is provided returning result data to the client using the standard network attached storage protocol.

In further embodiments, the advanced management functions comprise a first type of advanced management functions related to network attached storage objects and a second type of advanced management functions related to the network attached storage system itself.

In further embodiments, the special file system structure uses a certain file system extension and contains files and directories, wherein files are represented with their original file name, and directories are represented with their original directory name including a special file.

In further embodiments, the special file system structure represents one entity for files and directories; wherein the certain file system extension is added to a file system root only, or to each directory of a file system.

In further embodiments, the special file of the special file system structure contains at least one of the following: a list of available advanced management functions, advanced file properties, or a list of active management operations.

In further embodiments, the list of advanced management functions comprises at least one of the following functions: storage pool migration, server side copy, pre-population, tape migration, tape recall, clone creation, server side antivirus scan, snapshot creation, backup, restore, setting the network attached storage system into service mode, enabling or disabling services in the network attached storage system, or retrieving status information and audit logs from the network attached storage system.

In further embodiments, the list of advanced management functions is dynamically adapted based on capabilities of the network attached storage system, access rights of the client and custom user policies.

In further embodiments, the list of active management operations comprises status and progress information of a corresponding management operation and shows result data of the corresponding management operation.

In further embodiments, the client opens the special file for reading, to retrieve the advanced management functions.

In further embodiments, the client writes a request into a file following a predefined convention and format, to invoke one of the advanced management functions.

In further embodiments, the client opens a response section of a special file for reading, to obtain status and progress information or result data of corresponding management operations initiated by corresponding advanced management functions.

In another embodiment, a system for in-band management of a network attached storage environment comprises at least one client connected to a network attached storage system by using existing authorization and authentication procedures; wherein the network attached storage system comprises a standard network attached storage protocol, a base system, at least one file system, an internal management component, and an in-band management module communicating with the standard network attached storage protocol, the at least one file system, the internal management component; wherein the in-band management module creates a special file system structure to expose advanced management functions to the client using standard network attached storage protocols; wherein the client uses existing standard network attached storage protocol functions on special files of the special file system structure to retrieve the advanced management functions and to invoke one of the advanced management functions; wherein the in-band management module returns result data to the client using a feedback channel and the standard network attached storage protocol.

In further embodiments, the in-band management module translates client side file operations on the special file system structure into management action in the network attached storage system; and the client reads status or progress information or result data on the management actions in the special file system structure.

In another embodiment, a data processing program for execution in a data processing system comprises software code portions for performing a method for in-band management of a network attached storage environment when the program is run on the data processing system.

In yet another embodiment, a computer program product stored on a computer-usable medium, comprises computer-readable program means for causing a computer to perform a method for in-band management of a network attached storage environment when the program is run on the computer.

Management of prior art network attached storage (NAS) systems is only possible to the full extend via the administrative network attached storage (NAS) clients connected via dedicated management interfaces and networks that communicate to the network attached storage (NAS) internal management component.

Exemplary embodiments of the present invention introduce new methods for in-band management of advanced network attached storage (NAS) functions and address the limitations mentioned above in a novel manner.

All in all, embodiments expose advanced management functions over the network attached storage (NAS) protocols without the need of any changes in the network attached storage (NAS) protocols itself by using the basic protocol functions available today.

This is achieved by representing the set of management functions as a special file system structure exported over the standard network attached storage (NAS) protocols, the same way the actual files and directories are exposed. This special file system structure can be accessed by a network attached storage (NAS) client and thus management functions not exposed in prior art can be invoked by the client itself. Existing network attached storage (NAS) client authorization and authentication can be used to access and control the advanced management functions. For example, existing protocol function "rename" might trigger a clone operation, "delete" might trigger a cancellation of running actions etc. Access to the management functions is done based on the network attached storage (NAS) objects access control list (ACL). This control can be done as granular as access to the actual files and directories storing the customer data.

Embodiments furthermore allow publishing the set of available management functions in a dynamic fashion by adapting (extending or restricting) the content and as such the available management functions of the special file system structure in the network attached storage (NAS) system. Possible use cases for this novel extension are: an administrator temporarily revokes all advanced management capabilities during maintenance procedures. Advanced functions are exposed for specific clients only by adapting the access control. Advanced file system management functions are dynamically revoked in case a certain threshold is reached, such as a certain level of utilization is reached.

Embodiments comprise a system and method for exposing advanced management functions as a special file system structure over standard file access protocols; a system and method for translating client side file operations on the special file system structure into a management action in the network attached storage (NAS) system; system and method for providing status and progress information on management operations to network attached storage (NAS) clients in-band; and a system and method for dynamically adapting the set of published management functions based on policies and events in the network attached storage (NAS) system.

Embodiments include a system and method for using the existing data access channel (in-band) along with existing authentication and access mechanisms to invoke advanced network attached storage (NAS) functions by a client system. Since only existing file access operations like open, read, write, close are utilized, this can be done protocol independent without any changes in the protocols across all standard network attached storage (NAS) protocols.

Embodiments permit triggering vendor and storage system specific advanced management functions like snapshots, clones and much more without any changes to the file access protocols. Embodiments further permit an existing file access authentication mechanism to be exploited as well for in-band network attached storage (NAS) management.

Figure 1:
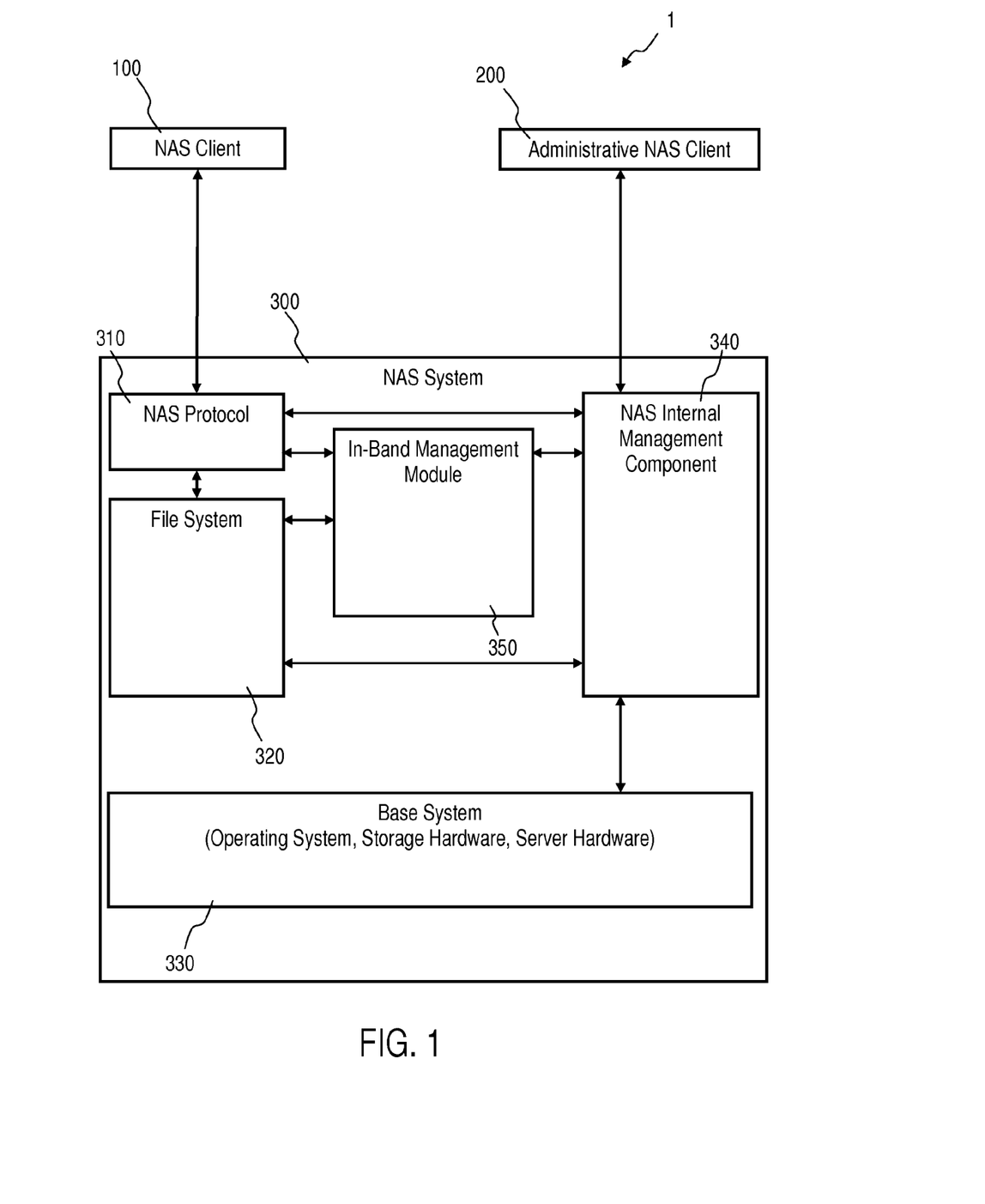
FIG. 1 is a schematic block diagram of a network attached storage (NAS) environment comprising a network attached storage (NAS) system, in accordance with an embodiment of the present invention.

Turning now to the Figures, FIG. 1 shows a network attached storage (NAS) environment 1 comprising network attached storage (NAS) system 100, in accordance with an embodiment of the present invention.

Referring to FIG. 1, the shown embodiment employs a system for in-band management of network attached storage (NAS) environment 1 comprising at least one client 100 connected to a network attached storage system 300 by using existing authorization and authentication procedures. The network attached storage system 300 comprises a standard network attached storage protocol 310, a base system 330, at least one file system 320, an internal management component 340, and an in-band management module 350 communicating with the standard network attached storage protocol 310, the at least one file system 320, and the internal management component. The in-band management module 350 creates a special file system structure to expose advanced management functions to the client 100 using standard network attached storage protocols 310. Further the client 100 uses existing standard network attached storage protocol functions on special files of the special file system structure to retrieve the advanced management functions and to invoke one of the advanced management functions. The in-band management module 350 returns result data to the client 100 using a feedback channel and the standard network attached storage protocol 310.

The typical network attached storage (NAS) system 300 includes components of the base system 330 including operating system, server and storage hardware and controllers. Sitting on top of these basic components are one or more file systems 320 which includes the files and directories that are exposed via the network attached storage (NAS) protocols 310. These exports are accessed over the network by the network attached storage (NAS) clients 100. Management of these network attached storage (NAS) system 300 with prior art is only possible to the full extend via administrative network attached storage (NAS) clients 200 connected via dedicated management interfaces and networks that communicate to the network attached storage (NAS) internal management component 340.

Embodiments introduce the new in-band management module 350 as illustrated in FIG. 1. The new in-band management module 350 communicates to the exported files system(s) 320; the network attached storage (NAS) protocol layer 310 as well as the network attached storage (NAS) internal management (administration) component 340. The inventive system introduces and creates a special virtual file system structure used to publish advanced management functions to the network attached storage (NAS) clients 100. For the remainder of this document this file system extension is named ".NASmgmt".

Since this special structure is created in the existing file system 320 where the actual data files reside, the client 100 already has the channel as well as the authority to access the additional meta information. This is handled as follows:

Retrieval of the list of available management functions is achieved by opening the file for reading (OPEN→READ→CLOSE).

Management function is invoked by writing the request into the file following a predefined convention and format (OPEN→WRITE→CLOSE).

Status on the operation as well as the result is obtained by reading the response section of the file (OPEN→READ→CLOSE).

File systems 320 exposed to network attached storage (NAS) clients 100 include files and directories. In this context files are referred to as "leaf" objects and directories are referred to as "containers".

There are different possible embodiments for mapping the ".NASmgmt" structure into the existing files system 320 that is exposed via the network attached storage (NAS) protocols 310. Some example embodiments are described below; other embodiments are possible as well.

The special file system structure represents one entity for leaf and container objects. Files are represented with their original file name while directories are represented as a directory with the original name which includes a special file named ".operations".

Table 1 shows an embodiment of the special file system structure added to the file system root only.

TABLE 1

| "Original" files system structure | additional files system structure |
|---|---|
| /NAS_FileSystem1/ | /NAS_FileSystem1/.NASmgmt/.operations |
| /NAS_FileSystem1/FileA | /NAS_FileSystem1/.NASmgmt/FileA |
| /NAS_FileSystem1/Dir1/ | /NAS_FileSystem1/.NASmgmt/Dir1/.operations |
| /NAS_FileSystem1/Dir2/FileB | /NAS_FileSystem1/.NASmgmt/Dir2/FileB |
| /NAS_FileSystem1/Dir3/Dir4/FileC | /NAS_FileSystem1/.NASmgmt/Dir3/Dir4/FileC |
| ... | ... |

Table 2 shows an embodiment of the special file system structure added to each container.

TABLE 2

| "Original" files system structure | additional files system structure |
|---|---|
| /NAS_FileSystem1/ | /NAS_FileSystem1/.NASmgmt/.operations |
| /NAS_FileSystem1/FileA | /NAS_FileSystem1/.NASmgmt/FileA |
| /NAS_FileSystem1/Dir1/ | /NAS_FileSystem1/Dir1/.NASmgmt/.operations |
| /NAS_FileSystem1/Dir2/FileB | /NAS_FileSystem1/Dir2/.NASmgmt/FileB |
| /NAS_FileSystem1/Dir3/Dir4/FileC | /NAS_FileSystem1/Dir3/.NASmgmt/.operations |
| ... | /NAS_FileSystem1/Dir3/Dir4/.NASmgmt/FileC |
| | ... |

Files in the special file system structure are accessible through standard network attached storage (NAS) protocols 310 and expose advanced management functions to the clients 100. Each special file contains a list of available management functions, advanced file properties and active operations. Network attached storage (NAS) clients 100 can read this information by using the protocol means to read files (CIFS/NFS read, HTTP get, etc.).

The file structure is divided into the following sections:

Functions

This section contains a list of the available management functions. Examples are storage pool migration, server side copy, pre-population, tape migration/recall, clone creation, server side antivirus scan, snapshot creation, backup/restore and much more. The list of offered functions is dynamically generated based on the network attached storage (NAS) system capabilities, access rights and custom user policies.

Advanced File Properties

This section will show additional file properties which are not available through the basic protocol features in prior art. Examples are file type (clone, clone parent, etc.), container type (directory or fileset), pool information, replication information and much more.

Active Operations

This section shows a list of active management operations triggered through this in-band management interface. It provides status and progress information for a management operation and shows the result of it. Certain management functions might result in time consuming operations and as such are executed asynchronously.

These special files have a fixed structure. One possible implementation might use the Extended Markup Language (XML). Other formats are possible.

```
<NASManagement>
    <Functions>
        <Function Name="Snapshot" SnapShotName="..." ... />
        <Function Name="MigrateToPool" PoolName="..." ... />
        <Function Name="ListPools" ... />
        ...
    </Functions>
    <Properties>
```

-continued

```
        <ObjectType>Fileset</ObjectType>
        <PoolName>Pool_1</PoolName>
        ...
    </Properties>
    <Operations>
        <ID="Unique Identifier" FunctionName="Clone"
        Result="SUCCESS"
        />
        <ID="Unique Identifier" FunctionName="Snapshot"
        Result="IN_PROGRESS" />
        ...
        <ID="Unique Identifier" FunctionName="ListPools"
        Result="SUCCESS">
            <ResultData>
            ...
            </ResultData>
        </ID>
    </Operations>
    <Request>
        <ID="Unique Identifier" FunctionName="Clone" />
    </Request>
</NASManagement>
```

In order to enforce structure and format of these files, existing XML capabilities can be used (such as enforcement via DTD—Document Type Definition).

One implementation of this meta data information (special files system structure) is in form of virtual files. The content of this virtual files is created "on the fly" by the inventive in-band management module 350. This is according prior art which is already used in other applications for example by a Linux virtual file system or a capability provided by FUSE (File System in User Space).

Figure 2:
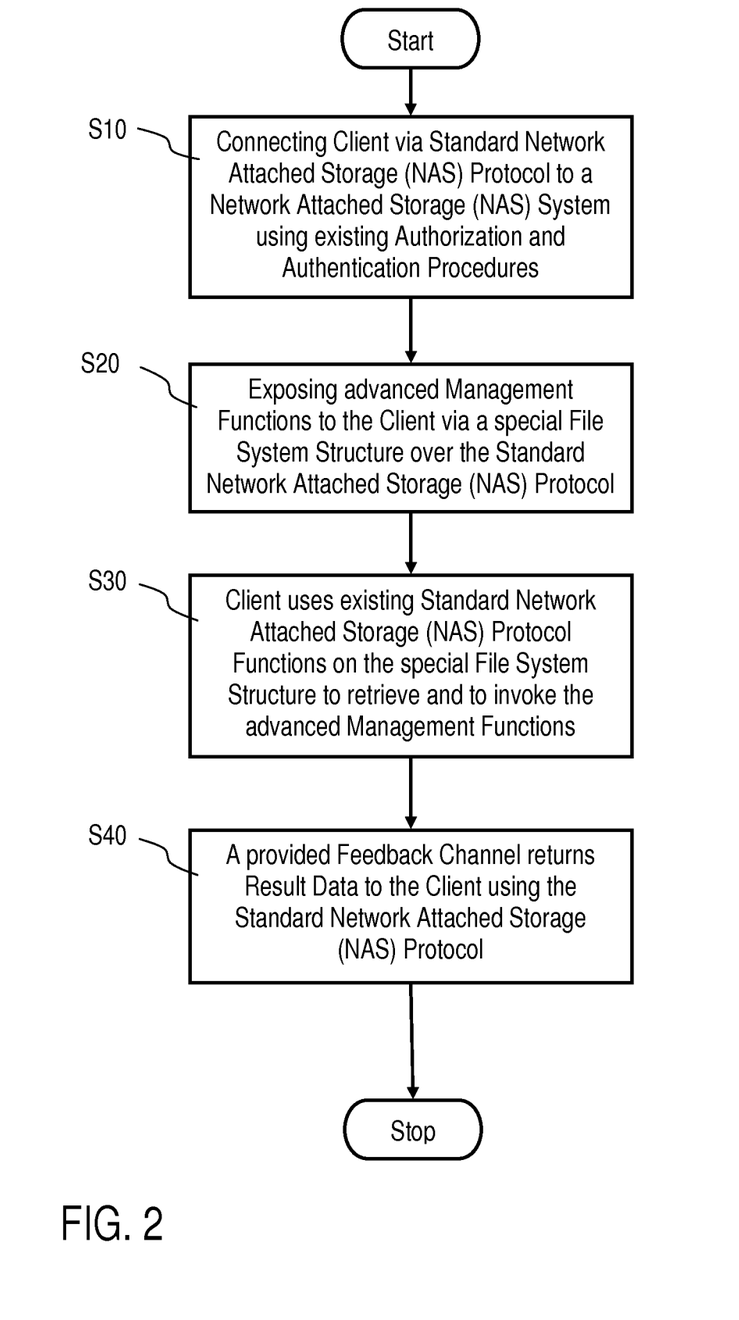
FIG. 2 is a schematic flow diagram of a method for in-band management of a network attached storage (NAS) environment, in accordance with an embodiment of the present invention.

FIG. 2 shows a method for in-band management of a network attached storage (NAS) environment 1, in accordance with an embodiment of the present invention.

Referring to FIG. 2 a method for in-band management of a network attached storage environment 1 comprises the steps of: connecting a client 100 via a standard network attached storage protocol 310 to a network attached storage system 300 using existing authorization and authentication procedures, in step S10; and exposing advanced management functions to the client 100 via a special file system structure over the standard network attached storage protocol 310, in step S20. The client 100 uses existing standard network attached storage protocol functions on the special file system structure to retrieve and to invoke the advanced management functions, in step S30. In step S40, a feedback channel is provided returning result data to the client 100 using the standard network attached storage protocol 310. The advanced management functions comprise a first type of advanced management functions related to network attached storage objects and a second type of advanced management functions related to the network attached storage system 300 itself. Each special file of the special file system structure contains at least one of the following: a list of available advanced management functions, advanced file properties, and a list of active management operations. The list of advanced management functions may comprise the following functions: storage pool migration, server side copy, pre-population, tape migration, tape recall, clone creation, server side antivirus scan, snapshot creation, backup, restore, setting the network attached storage system 300 into service mode, enabling or disabling services in the network attached storage system 300, or retrieving status information and audit logs from the network attached storage system 300, for example.

Figure 3:
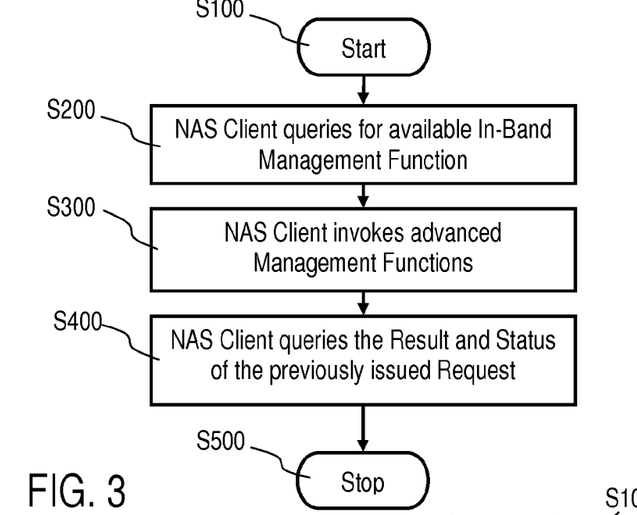
FIG. 3 is a schematic flow diagram of a network attached storage (NAS) client request, in accordance with an embodiment of the present invention.
Figure 4:
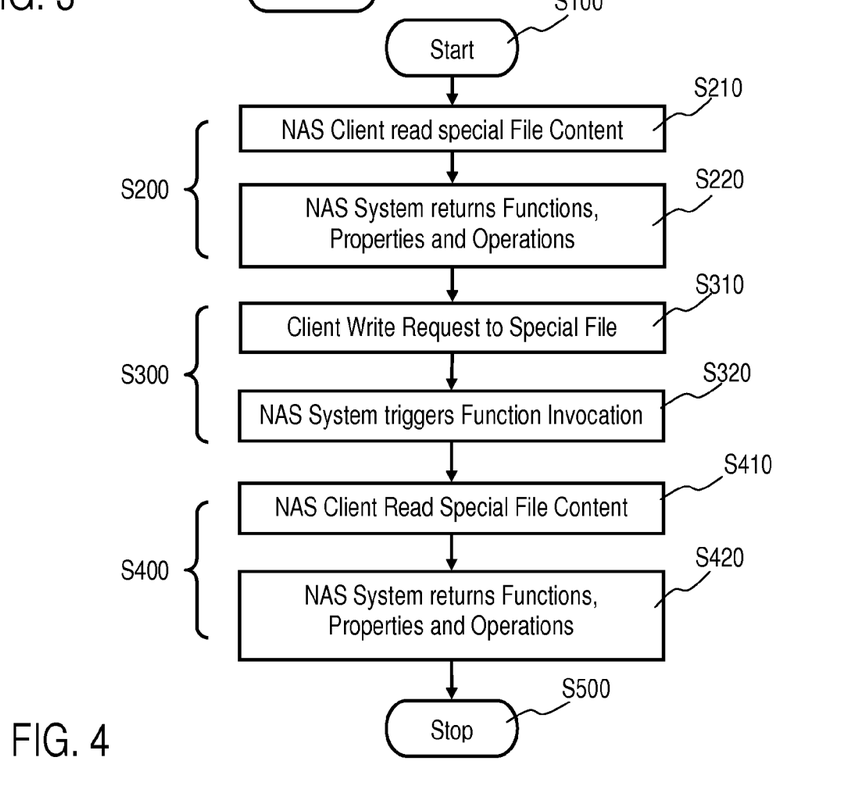
FIG. 4 is a more detailed flow diagram of the network attached storage (NAS) client request of FIG. 3.

FIGS. 3 and 4 show a network attached storage (NAS) client request, in accordance with an embodiment of the present invention.

FIGS. 3 and 4 illustrate the sequence diagram for a management request initiated by network attached storage (NAS) client in-band. The process starts in step S100. It continues to step S200 where the client 100 queries for available in-band management function. In step S210 the client 100 opens and reads the special file. This triggers the inventive in-band management module 350 which returns the available management functions of the network attached storage (NAS) system 300 as part of the file content in step S220. The process continues to step S300 where the network attached storage (NAS) client 100 invokes advanced management functions. This is done in step S310 where the network attached storage (NAS) client 100 writes to the special files, which triggers the related functionality in the network attached storage (NAS) system 100 in step S320. The in-band management module 350 translates the client side file operations on the special file system structure into management action in the network attached storage system 300, for example. The process continues to step S400 in which the network attached storage (NAS) client 100 queries the result and status of the previously issued request. This is done in step S410 where the client 100 opens and reads the special file content. The process continues to step S420 in which the in-band management module 350 interacts with the management functions of the network attached storage (NAS) system 300 in order to retrieve the requested information which is returned to the network attached storage (NAS) client 100 as part of the special file content. The client 100 reads status or progress information or result data on the management actions in the special file system structure, for example. This successfully completes the network attached storage (NAS) clients request and the process ends in step S500.

Concurrent operations to files and directories exported through network attached storage (NAS) protocols 310 that are issued by multiple clients 100 can be handled by setting a unique request token as part of the request invocation, for example using client and timestamp information.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for in-band management of a network attached storage environment comprising:
   connecting a client via a standard network attached storage protocol to a network attached storage system using existing authorization and authentication procedures;
   exposing advanced management functions to the client in-band via a special file system structure residing on the network attached storage system, over the standard network attached storage protocol,
   wherein the client uses existing standard network attached storage protocol functions on the special file system structure to retrieve and to invoke the advanced management functions,
   wherein each special file of the special file system structure comprises:
      a list of available advanced management functions that is dynamically adapted based on capabilities of the network attached storage system, access rights of the client and custom user policies;
      advanced file properties that are unavailable through features of the standard network attached storage protocol; and
      a list of active management operations comprising status and progress information of a corresponding management operation and showing result data of the corresponding management operation;
   wherein the special file system structure uses a certain file system extension and contains files and directors;
   wherein files are presented with their original file name and directories are represented with their original directory name including a special file;
   wherein the special file system structure represents one entity for files and directories;
   wherein the certain file system extension is added to a file system root only; and returning result data to the client using a feedback channel and the standard network attached storage protocol.

2. The method according to claim 1, wherein the advanced management functions comprise a first type of advanced management functions related to network attached storage objects and a second type of advanced management functions related to the network attached storage system itself.

3. The method according to claim 1, wherein the list of advanced management functions comprises at least one of the following functions: storage pool migration, server side copy, pre-population, tape migration, tape recall, clone creation, server side antivirus scan, snapshot creation, backup, restore, setting the network attached storage system into service mode, enabling or disabling services in the network attached storage system, or retrieving status information and audit logs from the network attached storage system.

4. The method according to claim 1, wherein the client opens the special file for reading, to retrieve the advanced management functions.

5. The method according to claim 1, wherein the client writes a request into a file following a predefined convention and format, to invoke one of the advanced management functions.

6. The method according to claim 1, wherein the client opens a response section of a special file for reading, to obtain status and progress information or result data of corresponding management operations initiated by corresponding advanced management functions.

7. A system for in-band management of a network attached storage environment comprising at least one client connected to a network attached storage system by using existing authorization and authentication procedures, the network attached storage system comprising:
a standard network attached storage protocol;
a base system comprising a processor;
at least one file system;
an internal management component; and
the processor configured to communicate with the standard network attached storage protocol, the at least one file system, and the internal management component, the processor further configured to create a special file system structure to expose advanced management functions to the client, in band, using the standard network attached storage protocol,
wherein the client:
uses existing standard network attached storage protocol functions on special files of the special file system structure, residing on the network attached storage system, to retrieve the advanced management functions and to invoke one of the advanced management functions, and the processor is further configured to return result data to the client using a feedback channel and the standard network attached storage protocol, wherein each special file of the special file system structure comprises:
a list of available advanced management functions that is dynamically adapted based on capabilities of the network attached storage system, access rights of the client and custom user policies;
advanced file properties that are unavailable through features of the standard network attached storage protocol; and
a list of active management operations comprising status and progress information of a corresponding management operation and showing result data of the corresponding management operation; and
wherein the special file system structure uses a certain file system extension and contains files and directors;
wherein files are presented with their original file name and directories are represented with their original directory name including a special file;
wherein the special file system structure represents one entity for files and directories; and
wherein the certain file system extension is added to a file system root only.

8. The system according to claim 7, wherein the processor is further configured to:
translate client side file operations on the special file system structure into management action in the network attached storage system; and the client reads status or progress information or result data on the management actions in the special file system structure.

9. A computer program product stored on a non-transitory computer-readable medium, comprising computer-readable program code, when executed on a computer comprising a processor, causes the processor to:
connect a network attached storage system to a client via a standard network attached storage protocol using existing authorization and authentication procedures;
expose advanced management functions to the client, in-band, via a special file system structure, residing on the network attached storage system, over the standard network attached storage protocol, wherein the client uses existing standard network attached storage protocol functions on the special file system structure to retrieve and to invoke the advanced management functions, wherein each special file of the special file system structure comprises:
a list of available advanced management functions that is dynamically adapted based on capabilities of the network attached storage system, access rights of the client and custom user policies;
advanced file properties that are unavailable through features of the standard network attached storage protocol; and
a list of active management operations comprising status and progress information of a corresponding management operation and showing result data of the corresponding management operation;
wherein the special file system structure uses a certain file system extension and contains files and directors;
wherein files are presented with their original file name and directories are represented with their original directory name including a special file;
wherein the special file system structure represents one entity for files and directories;
wherein the certain file system extension is added to a file system root only; and
return result data to the client using a feedback channel and the standard network attached storage protocol.

10. The computer program product according to claim 9, wherein the advanced management functions comprise a first type of advanced management functions related to network attached storage objects and a second type of advanced management functions related to the network attached storage system itself.

11. The computer program product according to claim 9, wherein the list of advanced management functions comprises at least one of the following functions: storage pool migration, server side copy, pre-population, tape migration, tape recall, clone creation, server side antivirus scan, snapshot creation, backup, restore, setting the network attached storage system into service mode, enabling or disabling services in the network attached storage system, or retrieving status information and audit logs from the network attached storage system.

\* \* \* \* \*